(No Model.)
A. V. RYDER.
SPRING HARROW TOOTH.
No. 474,461. Patented May 10, 1892.
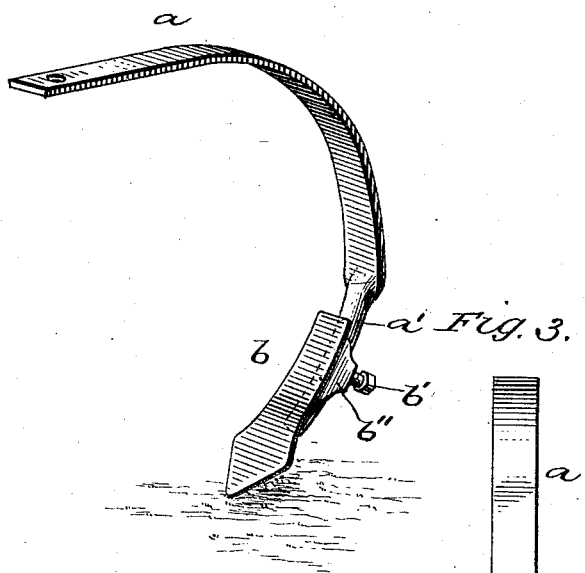
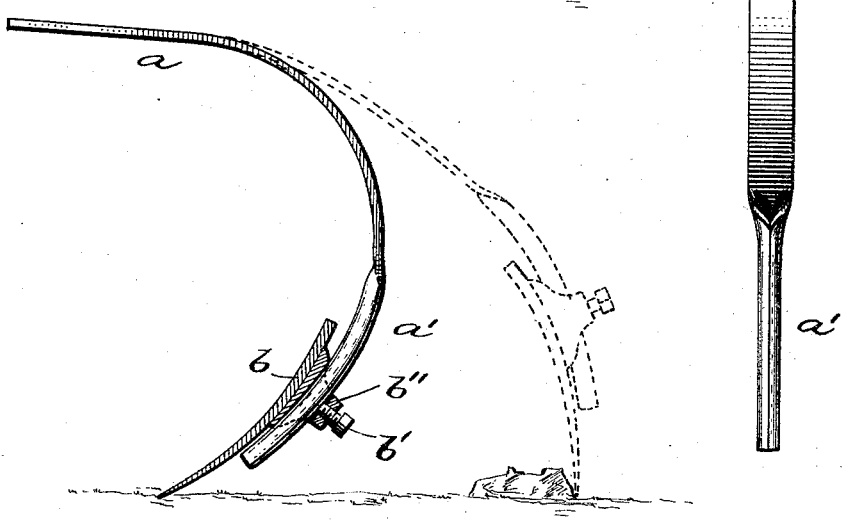
Witnesses
Wm R Davis
John M Walsh
Inventor
Andrew V. Ryder
By his Attorneys
Alexander F Davis

UNITED STATES PATENT OFFICE.

ANDREW V. RYDER, OF UNIONPORT, OHIO.

SPRING HARROW-TOOTH.

SPECIFICATION forming part of Letters Patent No. 474,461, dated May 10, 1892.

Application filed August 24, 1891. Serial No. 403,583. (No model.)

*To all whom it may concern:*

Be it known that I, ANDREW V. RYDER, a citizen of the United States, residing at Unionport, in the county of Jefferson and State of Ohio, have invented certain new and useful Improvements in Spring Harrow-Teeth, of which the following is a specification, reference being had therein to the accompanying drawings.

In the drawings, Figure 1 represents a perspective view of my improved spring harrow-tooth; Fig. 2, a side elevation, partly in section, of the same; and Fig. 3, a rear elevation of the spring-blade, the shovel or point being removed.

My invention has for its essential object to provide a spring harrow-tooth with a removable point or shovel, which shall be capable of a variety of adjustments; and it consists of certain novel features of construction that will be fully hereinafter described, and particularly pointed out in the claims.

The letter $a$ in the accompanying drawings designates the flat spring-blade, which is curved in the usual or any improved manner, and which has its lower curved portion formed into a round tube or rod $a'$, projecting forwardly and downwardly. This cylindrical portion $a'$ is preferably formed by simply turning or bending back the longitudinal edges of the lower portion of the blade until they meet in the rear of the same. A shovel or point $b$ is adjustably secured on the front side of the tubular portion by means of a set-screw $b'$, tapped through a socket $b''$, which is secured on the rear of the shovel and through which the tubular part passes. The cylindrical portion permits the shovel to be adjusted up and down, as may be desired, and also permits it to be adjusted rotatively, so that it may be arranged obliquely to the line of draft to throw the soil either to the right or left.

The shovel may be made any shape and size that the exigencies of the case may require; but it is preferably made of such length that its upper end shall terminate below the upper end of the rounded part of the tooth. This is advantageous in that the rounded part of the tooth is not so liable to catch and hold the grass and weeds and other débris that may lie in the path of the tooth as the broad flat surface of the tooth is.

This tooth, it will be observed, possesses the combined advantages of a spring-tooth and an adjustable shovel. The spring permits the tooth to readily pass obstructions and accommodate itself to the undulations of the soil, and making the shovel adjustable thereon permits the same to be arranged for various kinds of work.

This tooth is extremely simple and cheap in construction.

Having thus fully described my invention, what I claim as new, and desire to secure by Letters Patent of the United States, is—

A flat spring-tooth having its longitudinal edges of its lower end turned or bent and formed into a tube, in combination with an adjustable shovel secured thereon, substantially as described.

In testimony whereof I affix my signature in presence of two witnesses.

ANDREW V. RYDER.

Witnesses:
H. A. SCHLICHT,
J. H. WEBER,